United States Patent [19]

Bourns et al.

[11] Patent Number: 5,529,800
[45] Date of Patent: Jun. 25, 1996

[54] LOW DENSITY READY-TO-SPREAD FROSTING AND METHOD OF PREPARATION

[75] Inventors: Tricia J. Bourns, St. Louis Park; Albert L. Saari, Long Lake; Robert J. Stromgren, Anoka, all of Minn.

[73] Assignee: General Mills, Inc., Minneapolis, Minn.

[21] Appl. No.: 390,193

[22] Filed: Feb. 17, 1995

[51] Int. Cl.⁶ .................................................. A23L 1/00
[52] U.S. Cl. .......................... 426/572; 426/659; 426/319
[58] Field of Search ..................................... 426/474, 319, 426/572, 659

[56] References Cited

U.S. PATENT DOCUMENTS

| | | |
|---|---|---|
| 3,194,666 | 7/1965 | Bedenk et al. . |
| 3,253,928 | 5/1966 | Bedenk et al. . |
| 3,479,190 | 11/1969 | Ganz . |
| 3,520,698 | 12/1966 | Katz et al. . |
| 3,656,972 | 4/1972 | Blomberg ................................ 426/572 |
| 3,751,265 | 8/1973 | Seiden ..................................... 426/572 |
| 4,135,005 | 1/1979 | Cheng . |
| 4,379,176 | 4/1983 | Scherwitz ................................ 426/572 |
| 4,386,108 | 5/1983 | Richter .................................... 426/572 |
| 4,415,601 | 11/1983 | Eckel . |
| 4,431,682 | 2/1984 | Smith ...................................... 426/672 |
| 4,610,884 | 9/1986 | Lewis, III et al. . |
| 4,661,366 | 4/1987 | Pinto ....................................... 426/659 |
| 4,761,292 | 8/1988 | Augustine ............................... 426/659 |
| 5,080,921 | 1/1992 | Reimer .................................... 426/659 |
| 5,102,680 | 4/1992 | Glass et al. . |
| 5,158,798 | 10/1992 | Jung ........................................ 426/659 |
| 5,230,918 | 7/1993 | Anderson ................................ 426/659 |
| 5,376,399 | 12/1994 | Dreese .................................... 426/659 |

FOREIGN PATENT DOCUMENTS 1182325 2/1985 Canada .

*Primary Examiner*—Carolyn Paden
*Attorney, Agent, or Firm*—John A. O'Toole; L. MeRoy Lillehaugen

[57] ABSTRACT

A low density (0.75 to 0.95 g/cc) ready-to-spread ("RTS") frosting composition is described that exhibits reduced tendency for air cell collapse or coalescence upon extended storage and thus maintains its low density. The RTS frosting comprises: A. about 60 to 85% of a nutritive carbohydrate sweetening agent; B. about 15 to 25% of a shortening having a palm oil hardstock in a weight ratio of about 3 to 5:1; C. about 0.5 to 3% of a particular emulsifier system; D. about 0.1 to 0.5% of a viscosity agent; and E. about 10 to 20% moisture. The emulsifier system comprises: 1) a monoglyceride, and 2) an aerating emulsifier selected from the group consisting of polyoxyethylene fatty acid esters of polyhydric alcohols, polyoxyethylene sorbitan monostearate, polyglycerol esters of higher fatty acids, and mixtures thereof, and 3) optionally a polyglycerol ester.

The present RTS frosting is prepared by forming a liquid blend; homogenizing the blend; rapidly cooling the blend; adding an inert gas; and whipping with simultaneous cooling to form a fully aerated RTS frosting.

20 Claims, 2 Drawing Sheets

LOW DENSITY READY-TO-SPREAD FROSTING AND METHOD OF PREPARATION

FIELD OF THE INVENTION

The present invention relates to food products. More particularly, the present invention relates to ready-to-spread frosting compositions and, specifically, low density ready-to-spread frosting compositions.

BACKGROUND OF THE INVENTION

The present invention provides an improvement in consumer ready-to-spread ("RTS") frostings compositions and methods of preparation. Conventional RTS frostings have a density of about 1.1 g/cc. The present improvement resides in the provision of a low density (<0.9 g/cc) RTS frosting exhibiting increased resistance to air cell collapse upon extended storage.

"Icing" or "frosting" are the terms conventionally applied to a wide variety of spreadable, semi-solid confectionery products that are used as toppings to sweeten and decorate baked goods such as cakes, breads, cookies, and the like. Generally, such toppings can be categorized into several basic types depending, in part, upon whether the products contain shortening or not and/or whether the products are aerated or not, such as royal icings (unaerated, generally shortening free), fluffy frostings (aerated, shortening free), cream icings (unaerated, shortening containing), and aerated creamy frostings. The presence of a fat or shortening, of course, fundamentally changes the emulsion characteristics of a glazing composition. "Icing" is generally used to refer to an unaerated composition while "frosting" is generally used to refer to an aerated product. RTS frosting(s) is a type of aerated creamy (i.e., fat containing) frosting that is particularly designed for extended unopened package shelf stability at room temperature.

More specifically, icings, e.g., "royal" icings, typically refer to compositions containing primarily sugar and water, and optionally, adjuvants such as emulsifiers to enhance storage stability. As an important characteristic, these compositions generally harden to form firm, nonsticky toppings. Usually, such icings do not contain fat; however, a quick-hardening icing containing 3.3 to 5.9 wt % of a high melting point fat has been disclosed (see U.S. Pat. No. 4,415,601 issued to J. A. Eckel). Also, a heat stabilized icing containing up to about 4% of a high melting point fat, up to about 0.5% of an emulsifier, and up to about 0.1% of a gelling system of xanthan and locust bean gums has been disclosed (see U.S. Pat. No. 4,135,005 issued to H. Cheng). The latter formulation could be referred to as a "cream" or "buttercream" icing, however, the composition is not aerated.

Cream or butter-cream icing compositions typically refer to compositions prepared from scratch by the consumer containing sugar, water, and importantly, shortening. These compositions are usually formed into frostings or aerated by the consumer by whipping, upon which the density decreases from about 1.3 g/cc to about 1.1 g/cc. Such icings and frostings exhibit a rich and creamy mouth feel due, at least in part, to the high levels of shortening employed. The fats and shortenings commonly used for such icings include butter, margarine, and partially hydrogenated fats and oils.

So-called "bakery frostings" are highly aerated, e.g., <0.85 g/cc, that also typically contain high levels of shortening, e.g., >30%. Such frostings are unstable and are intended for immediate consumption.

"Fluffy frostings" (sometimes referred to in the art as "box" frostings) are uncooked, aerated, (e.g., 0.9 to 1.1 g/cc) sugary compositions, which are generally shortening-free, or at least very low in fat which typically comes from aerating emulsifiers. Fluffy frostings are typically prepared by the consumer from a dry mix by adding hot water to dissolve the sugar and whipping to form the final fluffy products. The dry mixes generally comprise high levels of sugar and further contain a foaming/aerating agent, such as egg albumin, gelatins, enzymatically degraded soy whipping proteins, or an aerating emulsifier, especially polyglycerol esters of fatty acids. Optionally, the dry mixes can contain very low levels of a wide variety of foam stabilizers, such as sodium alginate, gelatin, or a cellulose derivative, such as carboxymethylcellulose. Fluffy frostings have a unique and desirable mouth feel and eating quality because of their high levels of aeration. Whipped frostings are similar to fluffy frostings but include additional amounts of whipping agents or emulsifiers and are aerated to densities of about 0.75 g/cc. However, fluffy and whipped frostings are not shelf stable and thus not suitable for use as an RTS frosting.

Within this broad category of sweetened spreadable toppings or fillings are ready-to-spread ("RTS") frostings. RTS frostings are a popular food product due to the convenience provided by fully prepared products. Distinctively, RTS frostings are stored in an aerated state unopened at room temperature for longer times (a one year shelf life target is typical) or stored after opening at refrigerator temperatures for shorter times. RTS frostings are applied directly from the container to a cake or other baked good without mixing or any other manipulative techniques. RTS frostings are thus formulated so as to be usable without the addition of ingredients or other further preparation steps by the consumer. RTS frostings form a discrete category of frostings because of their extended shelf lives.

Desired organoleptic and performance properties for RTS frostings include a smooth texture, a "short" consistency, spreadability without flowing or running, resistance to syneresis or weeping in the unopened container, resistance to syneresis or weeping between cake layers upon overnight storage, a light density (i.e., 0.75 to 0.95 g/cc), and, most importantly herein, resistance to air cell collapse or coalescence upon extended shelf storage.

RTS frostings are thus a particular category of compositions. As a result, the wide body of art directed towards dry mixes for aerated frostings or compositions for icings provide little practical guidance or information regarding the provision of RTS frostings.

Attempts have been made in the past to provide a low density RTS frosting. Such low density products have not appeared on the market in part because of coalescence of their gas cells over time in the package rendered the RTS frostings' texture and appearance unacceptable. Upon opening of the container the frosting would exhibit large voids or air pockets resulting from a collapse of air cells and an heterogeneous texture due to density differences.

It is believed that these air cell coalescence problems are driven by the growth of larger gas cells by diffusion from small to large air cells. This process is driven by the larger internal gas pressure that occurs in small gas cells because of surface tension. The net effect is that the larger cells "cannibalize" the smaller cells. The process is further aggravated with the decreasing density of the freshly packaged frosting.

In view of the state of the art, there is a continuing need for low density RTS frostings that can maintain their desirable properties for the extended shelf lives required for RTS frostings.

Surprisingly, the present invention provides low density RTS frostings which exhibits reduced air cell coalescence upon extended storage. These RTS frostings are provided by formulating frostings having shortening ingredients that comprise a palm oil hardstock constituent in combination with particular gum ingredients and a particular emulsifier system.

SUMMARY OF THE INVENTION

In its product aspect, the present invention resides in a low density, ready-to-spread ("RTS"), shelf stable frosting composition having a density, broadly, of about 0.75 to 0.95 g/cc.

It has been surprisingly discovered that the low density, creamy, shelf stable frosting having the characteristics of RTS type frostings can be obtained by formulating the frosting to essentially include A) a sweetening agent, B) a high Solid Fat Index ("SFI") triglyceridic shortening system essentially including a palm oil, C) an emulsifier system, D) selected viscosity agents, and E) moisture.

The sweetening component comprises about 60 to 85%. The sweetening component comprises a nutritive carbohydrate sweetener such as sucrose.

The shortening component comprises about 15 to 25% and can be a partially hydrogenated plastic fatty triglyceride shortening such as prepared from soybean oil, cottonseed oil, or a mixture thereof. The shortening and emulsifiers of the shortening system can be added to the frosting compositions separately or in various combinations. Importantly, the shortening essentially comprises a palm oil hardstock in a weight ratio of shortening to palm oil hardstock of about 3 to 5:1.

The emulsifier system essentially comprises (1) a monoglyceride, (2) a lipophilic ethoxylated sorbitan monoester, and optionally, but preferably (3) a polyglycerol ester. The emulsifier component can be added in various forms, such as in the form of a melted blend, spray-dried emulsifier powder, i.e., a spray-dried emulsifier powder containing corn syrup solids and a small amount of a vegetable shortening and/or the shortening can be admixed with all or a portion of the emulsifier. The total amount of the emulsifier component essentially ranges from about 0.5 to about 3%.

The viscosity agent can be a hydrophilic colloid.

The present low density RTS frostings essentially comprise about 10 to 20% moisture from the syrup and added water.

In its method aspect, the present invention resides in methods for preparing a low density RTS frosting.

The present RTS frosting is prepared by forming a liquid blend; homogenizing the blend; rapidly cooling the blend; adding an inert gas; and whipping with simultaneous cooling to form a fully aerated RTS frosting.

DETAILED DESCRIPTION OF THE INVENTION

In its product aspect the present invention provides low density, RTS frostings for baked goods such as cakes, cookies, donuts, muffins, and the like. Most importantly, the present RTS frostings provide the benefit of exhibiting increased resistance to coalescence upon extended storage over a shelf life of at least one year. Each of the product ingredients as well as method of preparation and use are described in detail below.

Throughout the specification and claims all percentages used herein are in weight percentages, and are based on the total weight of the RTS frosting composition, and temperatures in degrees Fahrenheit unless otherwise indicated.

A. Sweetening Agents

A nutritive carbohydrate sweetening agent or "sugar(s)" is the principal essential ingredient in the present RTS frosting composition. The sugar provides bulk and body to the frosting and contributes to the organoleptic properties of the frosting, such as sweetness, texture, consistency, viscosity, density, and taste.

Useful as the "sugar" ingredient herein is any of a variety of edible oligosaccharides having one, two, or more saccharide groups including for example, sucrose, fructose, dextrose, maltose, lactose, galactose, sorbitol, and mixtures thereof. These sugars can be used in any of a variety of conventional forms, such as, for example, cane sugar, beet sugar, corn syrup, corn syrup solids, brown sugar, maple sugar, maple syrup, honey, molasses, and invert sugar. Preferably, the present sweetening agent is selected from the group consisting of sucrose, fructose, dextrose, maltose, and mixtures thereof. More preferably, the sweetening agent is a mixture of sucrose and corn syrup, which generally is a mixture of dextrins, maltose, fructose and dextrose. Most preferably, the sweetening agent is comminuted sucrose.

Various particle sizes are commonly available for sucrose, known in the trade as 6x, 10x, and 12x. The 12x ground sucrose, i.e., powdered sugar having an average particle size of 30 μm>, is preferred in the low density RTS frostings of the present invention. Typically, finely divided sugars are combined with a small amount, 3 to 6%, of a processing agent, i.e., a "free flow" agent, such as wheat starch for advantageous conveyance in a commercial process.

The total level of sweetening agents in the composition is adjusted within the present concentration ranges such that the appropriate sweetness level and suitable organoleptic properties are obtained for a storage stable ready-to-spread frosting. Suitable organoleptic properties of RTS frostings are very similar to those of aerated cream icings or buttercream frostings, i.e., smooth texture, short consistency, spreadability without flowing or running, and a density of about 0.75 to 0.95 g/cc. The total level of sweetening agents in the present RTS frosting composition essentially ranges from about 55 to 85%, preferably about 60 to 80%. For best results in terms of low density content and calories balanced with the desired product qualities, the present RTS frostings desirably comprise about 65 to 75% of the sweetening agent.

In more preferred embodiments, the sweetening agent herein comprises a blend of sucrose and corn syrup which also functions as a plasticizer and humectant. Also, the syrup functions to stabilize the composition and to inhibit the growth of sucrose crystals which would impart undesirable "grittiness" to the product. In these preferred embodiments, sucrose (including up to 6% wheat starch based upon the weight of sucrose) essentially comprises about 50 to 80% of the product, and more preferably about 65 to 75%. The corn syrup is present in an amount such that the spreadability and flowability of the frostings are enhanced, and maintained for a longer period of time, relative to conventional bakery frostings. Corn syrup ranges from about 1 to 25% of the frosting compositions, preferably about 10 to 25%. Higher syrup levels are especially useful for cocoa flavored products.

The sweetness of cereal syrups such as corn syrups is reported in dextrose equivalents ("DE"), with a higher number representative of a sweeter material. For example, a common corn syrup is a 63 DE corn syrup, available from A. E. Staley Co., Inc., which is moderately sweet, contains about 80% solids and is most preferred for use herein. Also useful are high maltose corn syrups (available from Cargill, Inc.).

Corn syrups, however, can be isomerized to form high DE corn syrups, i.e., with a DE level of about 60 to 90 DE, which are used to make high-fructose corn syrups, which are blends of fructose and glucose. Pure fructose or high-fructose corn syrups containing about 42 to 55% fructose can be used as the sweetening agent in the present frosting formulations, preferably in combination with sucrose. Typically, the more fructose in the composition, however, the more gum agent within the ranges specified herein is required to optimize the spreadability and flowability of the frostings or otherwise compensate for the increased flowability resulting from high corn syrup levels. Fructose can be present in the present frosting compositions at about 0.1 to 20%, preferably about 2 to 10%.

Fructose tends to lower the water activity ("Aw") of the present RTS frostings. Water activity is, of course, a measure of the amount of chemically available water, i.e., that which is not bound. The lower the water activity of a frosting, i.e., the lower the amount of "free" water, the less likely it is to dry out and harden. Furthermore, with a lower water activity solid particulates can be used, such as chips, without degrading the particulates. Also, the lower the water activity, the less the microbial growth, which results in the reduction or elimination of preservatives. As the amount of fructose increases, the water activity decreases. The water activity of the frosting compositions of the present invention that do not contain fructose is typically about 0.8, with a range of about 0.75 to 0.82.

B. Shortening

The present low density RTS frostings further essentially comprise a triglyceridic plastic shortening essentially characterized by having a palm oil hardstock constituent.

The plastic triglyceride shortening is the major contributor to the "fat" content in the low density RTS frosting compositions. By plastic is meant to define a solid, non-fluid, non-pourable and non-pumpable shortening at a room temperature of 70° F. (21° C.). The shortening preferably has a melting point of between about 115° and 130° F. (46.1° to 55.5° C.), preferably between about 120° to 126° F. (49° to 52° C.). In more preferred embodiments the shortening is further characterized as being hardened or partially hydrogenized and having an iodine value of about 55 to 75, and preferably about 61 to 69. In general, the lower the I.V., the greater the solids content. In more preferred embodiments, the plastic shortening comprises a beta prime crystal form tending shortening, that is a shortening whereby the solid phase is substantially in a beta prime phase crystalline form (i.e., at least 50% of the solids). A good description of such beta prime phase tending shortenings and their rapid cooling methods of preparation is given in U.S. Pat. Nos. 2,801,177 (issued Jun. 30, 1957 to E. S. Lutton and U.S. Pat. No. 3,253,928 (issued May 31, 1966 to Bedenk et al) which are incorporated herein by reference.

The partially hydrogenated triglyceride shortening can be made from any animal (e.g., tallow) or vegetable shortening. It is preferably a vegetable shortening, such as soybean oil, cottonseed oil, peanut oil, coconut oil, palm oil, corn oil, safflower oil, sunflower seed oil, canola oil and mixtures thereof. More preferably the vegetable shortening is made from partially hydrogenated soybean oil, safflower oil, cottonseed oil, and mixtures thereof.

Optionally, a portion of the essential and/or supplemental emulsifiers herein may be preblended with the shortening component to form an emulsified shortening. The term "emulsified shortening" is used herein to encompass the shortening component and the emulsifier component of the frosting compositions. The use of this term is not meant, however, to indicate that the emulsifiers are necessarily combined with the shortening prior to addition to the frosting composition, although such preblending is preferred for a portion of the emulsifiers as described in more detail below. The shortening can comprise up to about 3% of the shortening of the essential and/or supplemental emulsifiers. Emulsifiers are often added to the shortening as a manufacturing process convenience such as by a shortening supplier. While any emulsifier useful in the frosting composition can be preblended with the shortening component, those essential emulsifiers whose primary function is to modify the fat properties, e.g., distilled monoglycerides, are most typically preblended into the shortening.

The present frosting compositions comprise about 15 to 25% of the present shortening, preferably about 18 to 22%, and more preferably about 20%.

The present compositions essentially comprises about 1% to 6%, preferably about 3% to 5% of a palm oil hardstock fraction. Conveniently, the palm oil hardstock is blended into the shortening component and, for this reason, the above shortening content ranges include the palm oil hardstock component. Less conveniently, the palm oil hardstock can be separately added to the composition.

The palm oil hardstock, it is believed, prevents coalescence of the air cells by directing formation of beta prime crystals that are the basic structural element of a three dimensional matrix which holds the tiny gas cells. This palm hard fraction seems to be especially effective as we have found that other beta prime tending shortenings such as cottonseed oil or partially hydrogenated palm oil are not nearly as effective. Thus, the palm oil hardstock is important to the realization of a low density RTS frosting that is able to substantially maintain its density over extended storage periods. A palm oil hard fraction is the fraction obtained from winterization of a partially hydrogenated palm oil. The crystallized solids are screened out from the chilled palm oil to provide the palm oil hard fraction. Suitable palm oil hardstock fractions are commercially available from Karlshamn, Inc., (Columbus, Ohio). The palm oil hardstock fraction has an iodine value of about 35±10 and an elevated level of C-16 or palmetic fatty acids ($\geq$50%). Thus, the particular hardstock has a fatty acid profile different from palm oil which typically has about a 40% palmeric acid content. Also useful herein is a fully hydrogenated palm oil hardstock fraction or a palm oil hardstock stearine or "palm stearine" as used herein.

Palm oil is to be distinguished from palm kernel oil. Both palm kernel oil and palm oil are obtained from the same plant but from different parts. Palm kernel oil is obtained by expression of palm kernels. Palm oil is obtained from the husks rather than the seed nut. Palm oil is characterized by a red color resulting from a high carotene level. Also, palm oil is characterized by high levels of palmitic and oleic acids whereas palm kernel oil is a lauric oil similar to coconut oil, having little palmitic or oleic acid. Palm oil is fluid at room temperature in contrast to palm kernel oil.

As noted above, palm oil (and its hardstock fractions) are characterized by high levels of C-16 fatty acids. Surprisingly, other oils having a high proportion of C-16 fatty acids such as cottonseed oil and beef tallow are not effective for use herein. A partially hydrogenated cottonseed oil should also work in substitution for the palm oil hard fraction but surprisingly does not work. The cottonseed oil ought to work because it also has a high level of palmetic acid.

However, the present shortening can include up to about 2% of the frosting of butter. The butter can be used in partial substitution (on an equivalent fat basis) for the palm oil hardstock. However, butter used alone in total substitution for the palm oil hardstock for use herein should be avoided.

The shortening can be added in a plastic form but preferably is added to the frosting ribbon blender as is melted fat at about at least 130° F., preferably about 130° to 145° F. (54° to 63° C.) and as the very last ingredient. Insufficiently heated frostings may permit some undesirable crystallization of the hard fractions.

In preferred embodiments, the shortening has a solid fat index of 5 to 10 at 100° F. and comprises a partially hydrogenated soybean oil having about 7 to 10% cottenseed oil.

C. Emulsifier Component

The present RTS frosting compositions further essentially comprise a selected two component emulsifier blend. Emulsifier(s) is used herein to aid in providing a shorter texture, more spreadable consistency, body, and providing a creamy mouth feel. Emulsifiers also are employed herein to stabilize the water and fat components, provide freeze/thaw stability, provide the desired texture and mouth feel attributes in the present RTS frosting, increase the viscosity, and prevent icing breakdown due to moisture weeping. In addition to their effect on texture and mouth feel, emulsifiers also effectively aid in aerating the final product toward its initial target density of 0.75 to 0.85 g/cc.

As noted above, all or part of the emulsifiers can be added directly to the frosting composition as convenient, or be preblended with the shortening component prior to addition to the frosting compositions. Also, some emulsifiers can be prehydrated by addition to the water before being incorporated into the product.

Some emulsifier(s), e.g., monoglycerides, have relatively higher melting points than the shortening component. Consequently, as more emulsifier is added to the shortening to form an emulsified shortening, its melting point and hardness increases. As the increased emulsifier levels "harden" the shortening, blending with the other ingredients becomes more difficult. Thus, in preferred practice, a first portion of the emulsifier is preblended with the shortening, a second portion can be added in its dry powder form while a third portion is admixed in liquid form.

The selected emulsifier blend essentially comprises a monoglyceride as a first constituent. Distilled monoglycerides are preferred from a cost standpoint compared to a blend of mono- and diglycerides since distilled monoglycerides are less expensive based on the active ingredient. The monoglycerides affect the fat properties of the shortening. More particularly, these emulsifiers increase or aid the dispersion of the fat throughout the sugar syrup. The monoglyceride emulsifier preferably is a mixture of monoglycerides of higher fatty acids. The preferred monoglyceride is 75 to 80% oleic acid with the balance being linoleic acid and having an iodine value ("IV") of ≦50.

Of course, the distilled monoglyceride will contain low levels of other materials such as diglycerides and/or monoglycerides of other fatty acids or degrees of unsaturation. Mono- and diglyceride blends can be used if their monoglyceride fraction has the iodine value and fatty acid chain length. The present frosting compositions comprise about 0.5 to 0.8% of the monoglyceride.

In certain preferred embodiments, the emulsifier is preblended with the shortening to form emulsified shortening that contains at least about 2 to 7% (by weight of the shortening) of a monoglyceride emulsifier, and more preferably about 3 to 5% monoglyceride emulsifier.

The present frosting emulsifier system further essentially comprises an emulsifier that provides for a highly aerated frosting composition. Suitable aerating emulsifiers include esters of polyhydric alcohols (especially sorbitan esters) including polyoxyethylene fatty acid esters of polyhydric alcohols, especially polyethoxylated esters of sorbitan such as Polysorbate 60 (polyoxy-20-ethylene sorbitan stearate) and polyoxyethylene sorbitan monostearate (e.g., Tween-60 and Tween-80), polyglycerol esters of higher fatty acids, and mixtures thereof. Polysorbate 80 (i.e., a polyoxy-20-ethylene sorbitan monooleate) is the preferred aerating emulsifier. Since at higher levels an objectionable taste can develop, the concentration of Polysorbate 80 should be 0.01 to 0.1% of the frosting.

In more preferred embodiments, the Polysorbate 80 can be supplemented with, and the present frosting compositions additionally comprise, a polyglycerol ester(s). Preferred polyglycerol esters are selected from the group consisting of triglycerol monostearate, decaglycerol monooleate, decaglycerol monopalmitate, decaglycerol dipalmitate, hexaglycerol monostearate and mixtures thereof. Especially useful herein as a PGE is decaglycerol dipalmitate. If present, the polyglycerol esters can comprise about 0.05 to 0.2%, preferably about 0.05 to 0.15%.

These emulsifier blends can be added to the formulation directly, or in a variety of forms, such as in an emulsified shortening or as a powder.

The total amount of emulsifier(s) in the compositions of the present invention is adjusted such that suitable organoleptic properties are obtained. That is, the total level of emulsifiers is adjusted such that the low density RTS frostings have a creamy, rich mouth feel, a smooth texture, a short consistency, spreadability without flowing or running, and a density of about 0.75 to 0.95 g/cc. The present low density RTS frosting compositions preferably comprise about 0.5 to 1.0% of this aerating emulsifier(s). For better results, the total emulsifier level comprises about 0.5 to 0.8%.

If desired, the present essential emulsifier blend can be supplemented with additional emulsifiers. Suitable supplemental emulsifiers include unmodified monoglycerides, mono and diglyceride blends, triglycerol monostearate, sorbitan esters, propylene glycol fatty acid esters, and lecithin. Exemplary useful high HLB emulsifiers include ethoxylated monoglycerides, polysorbates, ethoxylated sorbitans, decaglycerol esters, e.g., decaglycerol dipalmitate.

D. Viscosity Agents

Still another essential ingredient in the present low density frostings herein is a viscosity building ingredient(s). The viscosity agents provide the finished frosting product with desirable body and texture. Also, these viscosity agents contribute towards the air cells holding gas and thus against air cell collapse and undesirable coalescence.

Suitable for use herein as a viscosity building ingredient is any of a variety of hydrocolloids such as guar gum, locust bean gum, alginates, xanthan gum, agar-agar, gellan gum, gelatin, pectin and low-methoxyl pectin and water soluble cellulose materials such as sodium carboxymethylcellulose, and methyl cellulose, microcrystalline cellulose and mixtures thereof. Preferred for use herein as the viscosity building ingredient is moderate to high viscosity carboxymethylcellulose (7500 cps at 1% solution). The carboxymethylcellulose can be used at about 0.03 to 0.08%, preferably about 0.04 to 0.07% and for best results about 0.04 to 0.06%. A particular example is marketed as AVICEL, which is a mixture of microcrystalline cellulose and sodium carboxymethylcellulose, available from Food and Pharmaceutical Products Division of FMC Corporation, Philadelphia, Pa.

The viscosity agents vary in the amount or concentrations needed to provide the desired end product attributes. Good results, however, are obtained when the viscosity agent(s) comprises about 0.04 to 3% of the frosting. Better results are obtained when the viscosity agents comprise about 0.15 to 0.2%, especially when the viscosity agents comprise a mixture of carboxymethylcellulose and xanthan gum.

E. Moisture Content

The present low density frosting compositions have a total moisture content ranging essentially from about 10 to 20%, preferably about 11 to 16%, and more preferably about 13.5 to 15%. The moisture is supplied in part by the moisture associated with the syrup component but primarily by added water. At higher moisture contents, product softness and microbial growth can occur.

The water can be added separately or as part of other frostings components, such as from corn syrup. Conventional potable water, preferably distilled water, which is substantially free of objectionable taste, colors, odors, and of approved bacteriological quality, is used.

The moisture content generally has an influence on the frosting's viscosity. Too much water produces a frosting that is too runny or has a pudding like consistency. Too little water produces a frosting that is too thick and difficult to spread. The viscosity of the low density RTS frostings generally ranges from about 15 to 90, preferably about 25 to 60, (direct viscometer readings on product transferred to a 211 cc cup) at ambient temperature, i.e., 70° F. (21° C.), as measured by a Brookfield Model RVT viscometer with a heliopath stand at 20 revolutions per minute using a T-F spindle.

Optional Additives

The present low density RTS frosting compositions optionally can additionally comprise a variety of adjuvant materials to modify the nutritional, organoleptic, flavor, color or other properties. In particular, the low density RTS frosting formulation can additionally include fat replacers, e.g., sucrose polyesters or hydrated colloidal protein dispersions (such as SIMPLESSE fat replacer, which is available from The NutraSweet Company). The present frostings can optionally further include sugar replacers or bulking agents, such as polydextrose, low DE maltodextrins, or specially modified starches. Purified polydextrose, which can be used to replace both sugar and fat, is disclosed in U.S. Pat. No. 4,622,233. If present, such fat or sugar substitutes can each comprise about 0.1 to 15% of the present compositions, preferably less than about 12%.

Additionally, synthetic and natural flavorings or coloring agents can be used in the frosting formulations of the present invention. Exemplary flavors include cream or cream cheese flavor, milk powder, chocolate, vanilla extract, vanilla powder, cocoa substitute, hazelnut, dutched cocoa, mint, lemon and mixtures thereof. Also, flavor materials and particulates, such as fruit and fruit extracts, nuts, chips, and the like, can be added to the frosting compositions as desired. The flavoring agents are preferably used in amounts of about 0.01 to 3%. The coloring agents are preferably used in amounts of about 0.01 to 0.05%.

Other additives can be present in the low density RTS frosting formulations in minor amounts, i.e., less than about 1%, preferably less than about 0.5%, if desired. They include, for example: salt, whiteners, such as titanium dioxide, etc., mold inhibitors, such as potassium sorbate, sorbic acid, dehydroacetic acid, sodium benzoate, etc., sequestering agents, acidulants, buffers, food acids, preservatives, antioxidants, such as butylated hydroxytoluene, butylated hydroxyanisole, etc., vitamins, minerals, and the like.

Sequestering agents are often used to control the concentration of radical species (e.g., $Cu^{}$, $Fe^{}$), which can have a deleterious effect on the color. A common sequestering agent is an alkali metal pyrophosphate, such as sodium acid pyrophosphate ("SAPP") buffer (pH=5.3 to 5.7). The sequestering agents are preferably used in amounts of about 0.04 to 0.4%.

Acidulants, such as citric, acetic, and phosphoric acids can also provide pH control, and function in other capacities as well. For example, citric acid can be used for pH control, to activate potassium sorbate for mold control, to counter the alkalinity of cocoa used in a chocolate formulation, and to impart a tart flavor to the frosting. The acidulants are preferably used in amounts of about 0 to 2.5%.

Method Of Preparation

The present methods of RTS frosting preparation require particular order of ingredient addition and sequence of preparation steps.

Figure 1:
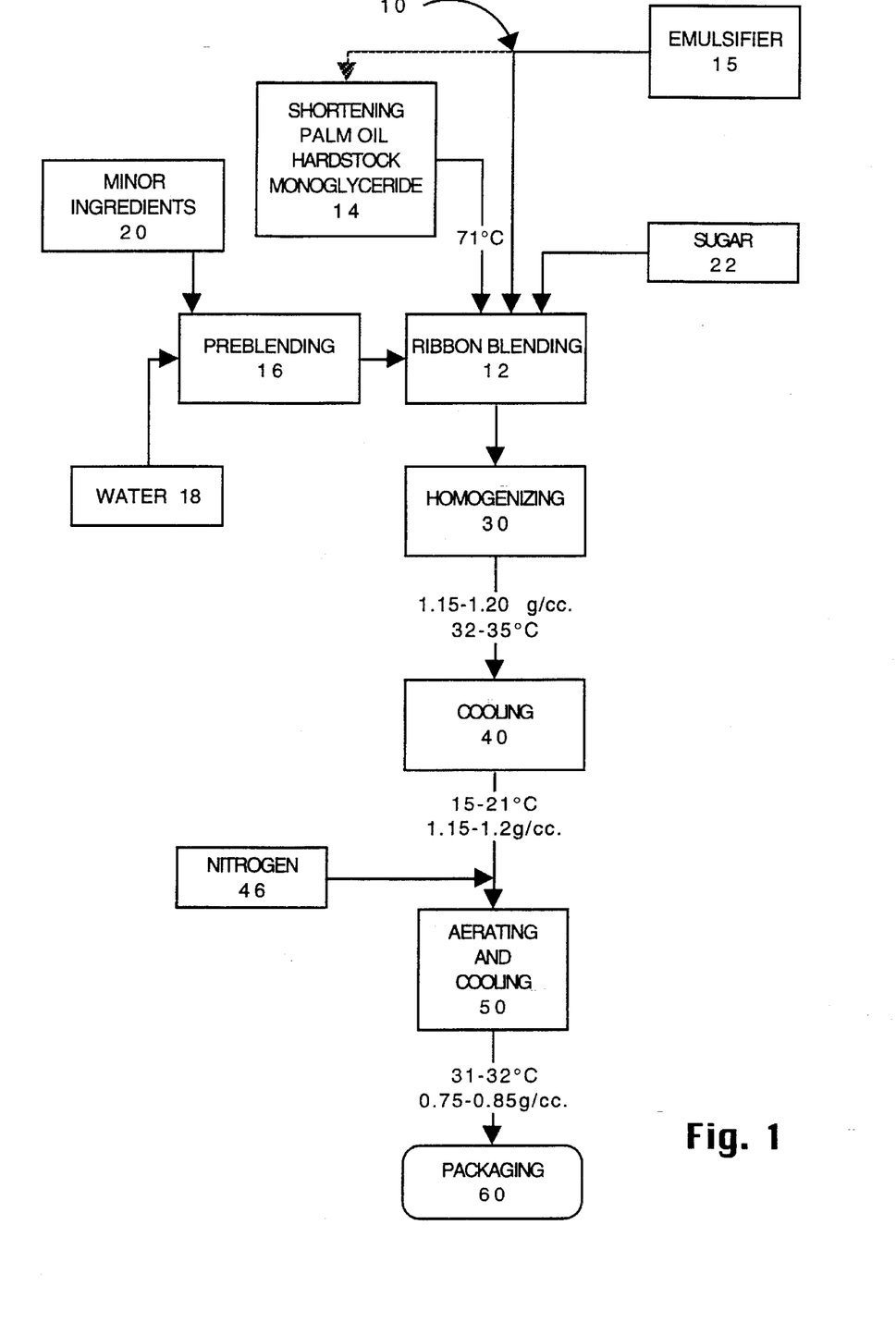
FIG. 1 is a simplified flow diagram of the present process with optional steps and variations in steps indicated with dotted lines.

Referring now to FIG. 1, there is depicted a schematic process flow diagram of the present methods of preparation generally indicated by reference numeral 10. The first essential step is a blending 12 of the essential and optional RTS formulation ingredients to form a uniform admixture by first mixing or blending together in any order the sweetening agents, water, viscosity agents, shortening, emulsifiers, and other additives in such a manner as to achieve a uniform fluid blend. A ribbon blender is particularly suitable for use herein to perform the uniform blending step.

The uniform blending step 12 can involve preblending substeps and/or ingredients handling. In particular, a molten shortening 14 at 135° to 145° F. (57.2° to 62.7° C.) is added into a mixer. The blending step 12 can further include a preblending step 16 which admixes a preblend of minor ingredients 20 with water 18 (20° to 30° C.) to form a slurry. The slurry formation allows for hydration of the viscosity agents. The preblend dry mix 20 contains "minor" ingredients, flavor, color and emulsifier. The preblend can be mixed with water 22 for about five minutes.

The wet slurry and melted shortening form an emulsion upon blending. To this emulsion, powdered sugar 22 is added and further mixing is conducted. In preferred variations, the uniform blending step 12 can involve a period of high shear blending to better break up and disperse the dry ingredients. Also. In preferred variations, the shortening ingredient is added last to the mixture.

During the approximately five minutes of mixing, the shortening dispersed in the product is cooled to about 95° F. at which more seeding and crystallization of perhaps 5% of the fat occurs. During uniform blending step 12 the hardest fractions of the shortening begin to crystallize to "seed" the still liquid shortening.

The process 10 further essentially comprises a step of homogenizing 30 the uniform blend to form an homogenized frosting composition or frosting base. The present homogenizing step 30 can conveniently be practical using a two-stage piston (e.g., 100 psi, 750 psi) homogenizer. The homogenization step reduces the fat particle size to a few microns in diameter. The homogenized base is warmed about 2° C. by the work of the homogenization step.

The next essential step involves rapidly cooling 40 the homogenized frosting base to a temperature of about 15.5° to 26.2° C. (60° to 80° F). The principle of this step is to convert the molten shortening in the homogenized base into plastic shortening in situ after it has been dispersed in the final product base. The rapid cooling step promotes the fat crystallizing desirably into a beta prime crystalline form. Rapid cooling promotes the desirable growth in the shortening of beta prime tending fat crystals which better hold the gas within the small air cells. Such gas entrainment minimizes coalescence upon storage. For example, immediately after homogenization the product is passed through a swept surface heat exchanger and cooled to less than 70° F. (21° C.). A suitable device for this step referred to in the art as a "Votator" is described in U.S. Pat. No. Re. 21,406 to C. W. Vogt, Mar. 19, 1940.

The cooled homogenized frosting base is next admixed with nitrogen gas 46 or other inert gas. The gas can be simply sparged into the frosting base. Any conventional method can be used. For example, the gas can be forced through small orifices into the composition as the composition flows through a tube or vessel into a mixing chamber, where uniform distribution occurs. Any conventional non-toxic, odorless, tasteless propellant, such as air, nitrogen, nitrous oxide, carbon dioxide, and mixtures thereof can be used.

The present process 10 additionally essentially comprises the step of aerating or whipping 50 the cooled, homogenized frosting base from a native density of about 1.3 g/cc to a density of about 0.75 to 0.95 g/cc. During aeration, it is very important that the temperature be controlled by simultaneous cooling so that the frosting product remains below about 32° C. (90° F.) during the aeration step. The cooling is needed to offset the heat generated in the frosting during the aeration step. Maintaining the temperature below 95° F. (35° C.) is important to maintaining the fat in the desired crystal state which, in turn, is important to minimizing air cell collapse upon extended storage. The preferred target temperature is 90° to 94° F. (32° to 34° C.).

The aerated low density frosting of the present invention can thereafter be packaged 60 in suitable air tight containers or packages (e.g., plastic tubs) for distribution and sale. In highly preferred embodiments, the packaging step is practiced using a gentle, low shear packaging with minimum piping in order to avoid collapse of the frosting and within 15 minutes of aeration.

In the present process, it is desirable to avoid pumping the aerated frosting. Pumping or other techniques that impart shear to the aerated product can result in weakening the foam structure. Indeed, post aeration shear can result undesirably in stirring the product down to its native density. In the preferred packaging method, the product is fed to a sealable hopper. Low pressure air (10 to 15 psig) is supplied to the hopper from which the product is fed to tubs using air pressure rather than pumping.

Figure 2:
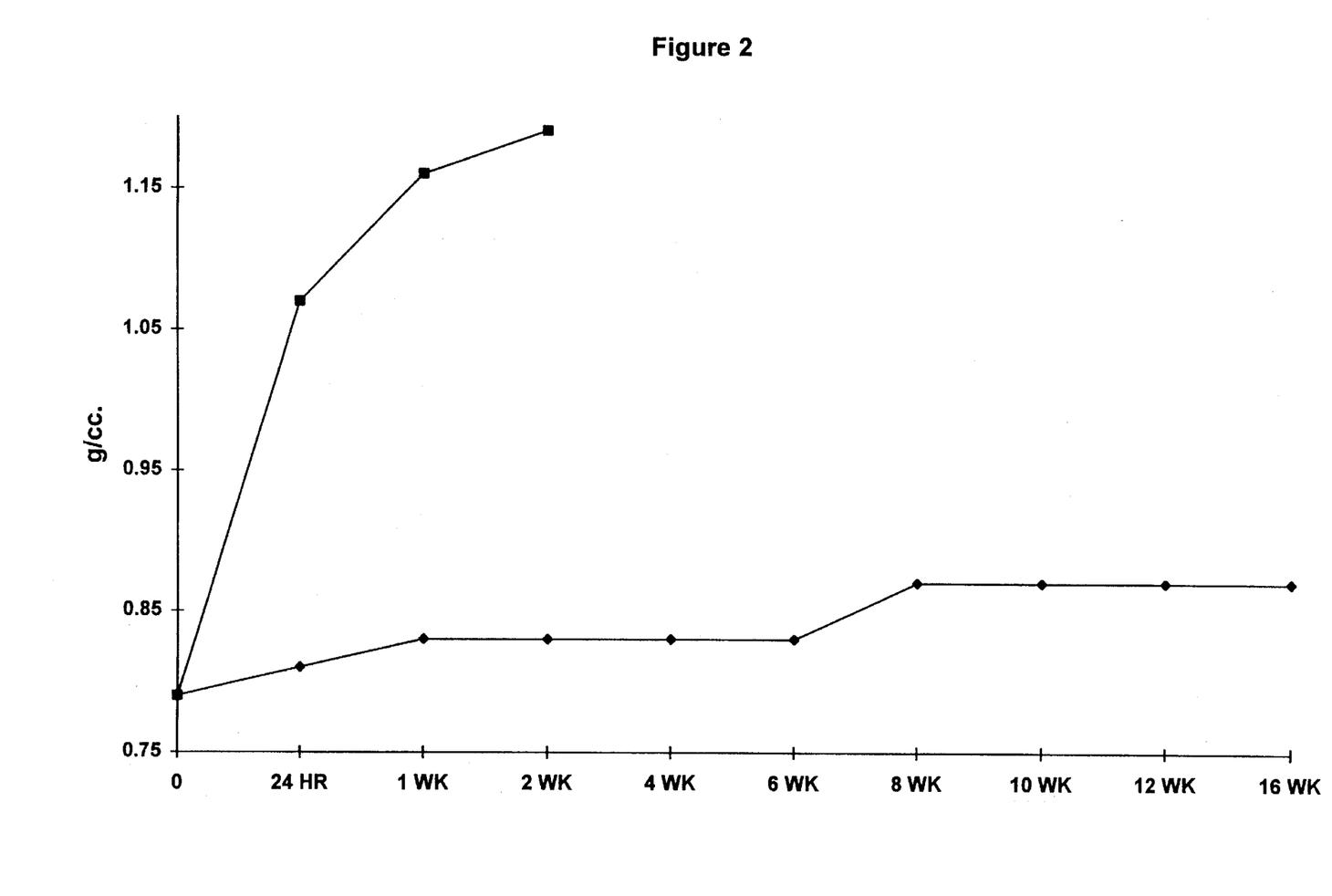
FIG. 2 depicts density versus time curves for the RTS frosting compositions exemplified in Example 1.

The present RTS frostings are essentially aerated from a native density of about 1.3 g/cc so as to provide finished products importantly characterized by a density essentially initially ranging from about 0.75 to 0.95 g/cc, preferably about 0.75 to 0.85 g/cc. Of, course, even the improved frostings herein will exhibit some tendency to coalesce as observed by a modest increase in density over extended storage times as illustrated in FIG. 2. A transition in texture occurs at about a density of 0.85 to 0.9 g/cc. Thus, after extended storage, e.g., after two months, the frostings preferably have densities that range from about 0.8 to 0.88 g/cc.

An advantage of the present highly aerated frosting compositions is a lighter color with equivalent whitening ingredients addition levels due to incorporation of more gas into the product. The product is perceived to be lighter in taste and density due in part to the lighter appearance.

Most surprisingly, the present frosting compositions are storage stable in a sealed container for up to about one year under ambient conditions and still maintaining its desirable spreadable consistency and without minimal syneresis, i.e., a water layer forming, and with reduced coalescence. Furthermore, the unopened containers of the low density RTS frosting compositions are oxidatively stable against spoilage or other degradation without refrigeration for extended times.

Still another advantage of the present frosting resides in their spreadability, especially over the surface of a baked high ratio layer cake. This advantage is particularly evident after the frosting has been refrigerated prior to use. For example, a 16 oz. frosting container may be opened, partially used, refrigerated for storage after opening, and then applied to a baked good.

Still another advantage is that the frosting s have fewer calories per volume of product.

Another advantage is that the product has lower ingredient costs per volume.

Industrial Applicability

The present frosting compositions are particularly suitable for use in the packaged foods industry for both the grocery retail trade to consumers and the institutional and food service markets.

EXAMPLE 1

A low density vanilla ready-to-spread frosting of the present invention was prepared having the following formulation.

| Ingredients | Vanilla Low density RTS Frosting (Wt. %) |
|---|---|
| Sugar (sucrose) | 59.20 |
| Shortening | 14.66 |
| Palm oil hardstock | 4.70 |
| Water | 13.01 |
| Corn syrup (high maltose) | 6.45 |
| Distilled monoglyceride | 0.40 |
| Polysorbate 80 | 0.10 |
| Carboxymethylcellulose | 0.05 |
| Vanilla flavor | 0.70 |
| Titanium dioxide | 0.20 |
| Salt | 0.20 |
| Potassium sorbate | 0.13 |
| Yellow color blend | 0.10 |
| Sodium acid pyrophosphate | 0.10 |
| | 100.00% |

The shortening was heated to 71° C. to form a molten shortening.

A premix comprising the minor ingredients was added to the molten shortening in a ribbon blender and mixed for about five minutes to form an emulsion. The powdered sugar was added to this emulsion and mixed with a combination of a high shear blade in a ribbon mixer for about three minutes until uniform to form an homogeneous complete mix.

This complete mix was homogenized, cooled rapidly in a swept surface heat exchanger and aerated with nitrogen gas in an Oakes high shear mixer to an initial density of 0.79 g/cc. The aerated product was packaged immediately thereafter in tubs with minimal shear and stored at room temperature (70° to 80° F.).

The density of the frosting was periodically measured to determine resistance to air cell collapse. The results of such testing is indicated by line 12 on the graph that is FIG. 2. The product was tested by measuring the density after stirring 30 rounds with a spatula in the tub. All data was taken at room temperature. Generally stated, after 39 weeks, the density was 0.86 g/cc and the product possessed good spreadability and organoleptic properties.

For comparison, a conventional commercially available RTS frosting formulation (Betty Crocker™) having a 15% shortening level not containing a palm oil hardstock and different emulsifiers was also tested. This conventional frosting was similarly aerated to a comparable initial density. The time vs. density graph is depicted as curve 14 on the graph that is FIG. 2.

The results of such testing show that a conventional frosting, illustrated by line 14, similarly prepared within a short period of time reverts to a relatively high density and thus fails to provide extended resistance to air cell collapse. In, contrast, the present RTS aerated frosting composition, illustrated by line 12, retains its very high levels of aeration even for extended storage times.

EXAMPLE 2

A low density RTS frosting of the present invention was prepared having the following formulation with egg albumen replacing the gum of Example 1.

| Ingredients | (Wt. %) |
| --- | --- |
| Sugar (sucrose) | 57.25 |
| Shortening | 14.66 |
| Palm oil hardstock | 4.70 |
| Water | 13.01 |
| Corn syrup (high maltose) | 6.45 |
| Egg albumen (dry) | 2.00 |
| Distilled monoglyceride | 0.40 |
| Polysorbate 80 | 0.10 |
| Vanilla flavor | 0.70 |
| Titanium dioxide | 0.20 |
| Salt | 0.20 |
| Potassium sorbate | 0.13 |
| Yellow color blend | 0.10 |
| Sodium acid pyrophosphate | 0.10 |
| | 100.00% |

The RTS frosting was prepared in a manner similar to that described in Example 1 and aerated to an equivalent density.

This formula was especially easy to aerate forming a very stable product. After 36 weeks of storage at room temperature, the stirred density was 0.84 g/cc. The product was somewhat more stiff but had a high level of "fluffy" character. Other examples employing gelatin, soybean protein isolate in place of the egg albumen, have been prepared with adequate storage stability.

EXAMPLE 3

A low density vanilla ready-to-spread frosting of the present invention was prepared having the following formulations.

| Ingredients | Weight % |
| --- | --- |
| Sugar (sucrose | 59.18 |
| Shortening | 14.66 |
| Palm oil hardstock | 4.70 |
| Water | 13.01 |
| Corn syrup (high maltose) | 6.45 |
| Distilled monoglyceride | 0.40 |
| Polysorbate 80 | 0.10 |
| Sodium alginate | 0.05 |
| Vanilla flavor | 0.70 |
| Titanium dioxide | 0.20 |
| Salt | 0.20 |
| Potassium sorbate | 0.13 |
| Yellow color blend | 0.10 |
| Sodium acid pyrophosphate | 0.10 |
| Calcium oxide | 0.02 |
| | 100.00% |

The RTS frosting was prepared in a manner similar to that described in Example 1 and aerated to an equivalent density.

This example had a stirred density of 0.88 g/cc after 36 weeks at room temperature and had good organoleptic properties similar to the previous samples.

RTS frostings of equivalent aeration stability and desirable texture can be realized when the alginate is replaced with an equivalent amount of low methoxyl pectin and/or carrageenan gums.

EXAMPLE 4

A milk chocolate flavored, low density frosting of the present invention was prepared:

| Ingredient | Weight % |
| --- | --- |
| Sugar | 42.86 |
| Shortening | 14.96 |
| Palm oil hardstock | 4.70 |
| Distilled monoglyceride | 0.50 |
| Polysorbate 80 | 0.10 |
| Water | 14.55 |
| Corn syrup (high maltose) | 14.62 |
| carboxymethyl cellulose | 0.04 |
| Cocoa w/alkali | 2.50 |
| Nonfat dry milk solids | 4.00 |
| Salt | 0.30 |
| Potassium sorbate | 0.13 |
| Sodium acid pyrophosphate | 0.10 |
| Citric acid | 0.15 |
| Color | 0.40 |
| | 100.00 |

The RTS frosting was prepared in a manner similar to that described in Example 1 and aerated to an equivalent density.

At this point, only seven day storage data is available.

What is claimed is:

1. A low density ready-to-spread frosting composition which nonetheless exhibits a spreadable consistency for an extended shelf life, comprising:

A. about 60 to 85% of a sweetening agent;

B. about 15 to 25% of a plastic shortening blend comprising
  1. about 12 to 20% of the composition of a partially hydrogenated shortening, and
  2. about 3 to 5% of the composition of a palm oil hardstock having an iodine value of about 25 to 45 and a palmeric fatty acid content of greater than or equal to 50%;

C. about 0.5 to 3% of emulsifiers, including
  1. about 0.5 to 0.8% of the composition of a monoglyceride,
  2. about 0.01 to 0.1% of the composition of an aerating emulsifier selected from the group consisting of polyoxyethylene fatty acid esters of polyhydric alcohols, polyoxyethylene sorbitan monostearate, polyglycerol esters of higher fatty acids, and mixtures thereof;
D. about 0.05 to 1.0% of a hydrophilic colloid viscosity agent; and
E. about 10 to 20% moisture, wherein the frosting has a density of about 0.75 to 0.95 g/cc.

2. The frosting composition of claim 1 wherein the shortening blend is a beta prime crystal tending derived from cottonseed, soybean, canola, corn oil, safflower, palm oil, palm kernel oil, coconut oil, tallow and mixtures thereof.

3. The frosting composition of claim 2 wherein the emulsifier additionally comprises:
  3. about 0.05 to 0.2% of a polyglycerol ester.

4. The frosting composition of claim 3 wherein A. the sweetening agent comprises:
  1. about 40 to 60% of the composition of powdered sucrose having an average particle size of less than 30 microns,
  2. about 1 to 25% of a corn syrup.

5. The frosting composition of claim 4 wherein the monoglyceride is distilled and wherein the shortening is a beta prime crystal form tending shortening and wherein the corn syrup is a high maltose corn syrup and is present at about 10 to 25% of the composition.

6. The frosting composition of claim 5 wherein the shortening has an iodine value ranging from about 55 to 75 and is present at about 18 to 22% of the composition.

7. The frosting composition of claim 6 wherein the shortening has an iodine value ranging from about 55 to 75 and is present at about 18 to 22% of the composition.

8. The frosting composition of claim 7 wherein the frosting has an density ranging from about 0.80 to 0.89 g/cc.

9. The frosting composition of claim 8 wherein the sweetening agent includes sucrose and corn syrup and wherein the emulsified component comprises a monoglyceride having an iodine value less than about 20 and wherein the moisture content ranges from about 11% to 16%.

10. The frosting composition of claim 9 wherein the moisture content ranges from about 13.5% to 15%.

11. A method for making a low density ready-to-spread frosting exhibiting resistance to coalescence upon extended storage comprising the steps of:
A. admixing to form a fluid uniform mixture:
  1. about 60 to 85% of a sweetening agent;
  2. about 15 to 25% of a plastic shortening blend comprising
    a. about 12 to 20% of the composition of a partially hydrogenated shortening, and
    b. about 3 to 5% of the composition of a palm oil hardstock having an iodine value of about 25 to 45 and a palmetic fatty acid content of greater than or equal to 50%;
  3. about 0.5 to 3% of emulsifiers, including
    a. about 0.5 to 0.8% of the composition of a monoglyceride,
    b. about 0.01 to 0.1% of the composition of an aerating emulsifier selected from the group consisting of polyoxyethylene fatty acid esters of polyhydric alcohols, polyoxyethylene sorbitan monostearate, polyglycerol esters of higher fatty acids, and mixtures thereof;
  4. about 0.05 to 1.0% of a hydrophilic colloid viscosity agent; and
  5. about 10 to 15% added water;
B. homogenizing (30) the blend to form an homogenized frosting blend having a native density of about 1.15 to 1.2 g/cc and a temperature of about 90° to 95° F. (32° to 35° C.);
C. rapidly cooling the homogeneous blend to cool to a temperature of about 60° to 70° F. (15° to 31° C.) within a residence time of about 2 to 30 seconds, to form a cooled frosting blend;
D. admixing an inert gas with the cooled frosting blend; and
E. aerating the gas and cooled frosting blend while cooling to form an aerated frosting having a density of about 0.75 to 0.85 g/cc and a temperature of about 85° to 95° F. (29° to 35° C.).

12. The method of claim 11 wherein the aerating step has a residence time of about 0.5 to two minutes.

13. The method of claim 12 additionally comprising the step of:
F. packaging the aerated frosting without inparting shear within 15 minutes of aerating in a air tight container and at a temperature of less than 95° F.

14. The method of claim 13 wherein the shortening blend is a beta prime crystal tending derived from cottonseed, soybean, canola, corn oil, safflower, palm oil, palm kernel oil, coconut oil, tallow and mixtures thereof.

15. The method of claim 14 wherein the frosting includes about 0.05 to 0.2% of a polyglycerol ester.

16. The method of claim 16 wherein the emulsifier additionally comprises about 0.05 to 0.2% of a polyglycerol ester.

17. The method of claim 16 wherein the sweetening agent comprises about 40 to 60% of the composition of powdered sucrose having an average particle size of less than 30 microns and about 1 to 25% of a corn syrup and wherein the shortening has a melting point of between about 115° and 130° F. (46.1° to 55.5° C.).

18. The method of claim 17 wherein the monoglyceride is distilled and wherein the corn syrup is a high maltose corn syrup and is present at about 10 to 25% of the composition and wherein step A comprises the substeps of forming an aqueous slurry of the viscosity agent(s) and added water, heating the shortening to form a molten shortening having a temperature of about 70° to 75° C. and admixing the slurry and molten shortening with the sweetening ingredient(s).

19. The method of claim 18 wherein the monoglyceride is distilled and wherein the shortening has an iodine value ranging from about 55 to 75, a melting point of between about 120° to 126° F. (49° to 52° C.) and is present at about 18 to 22% of the composition and wherein the sweetening agent includes sucrose and corn syrup and wherein the emulsified component comprises a monoglyceride having an iodine value less than about 20.

20. The method of claim 19 wherein the shortening has an iodine value ranging from about 55 to 75 and is present at about 18 to 22% of the composition and the gas is nitrogen.

* * * * *